United States Patent [19]
Pickens et al.

[11] Patent Number: 5,533,269
[45] Date of Patent: Jul. 9, 1996

[54] FOOD CUTTER

[76] Inventors: Bruce M. Pickens; Julie D. Pickens, both of 404 Glenmeade Ct., Gretna, La. 70053

[21] Appl. No.: 371,424

[22] Filed: Jan. 11, 1995

[51] Int. Cl.⁶ .................................................. B26B 5/00
[52] U.S. Cl. ............................... 30/304; 30/293; 30/294
[58] Field of Search .......................... 30/292–294, 114, 30/304, 306, 307, 312, 317; 99/537

[56] References Cited

U.S. PATENT DOCUMENTS

| | | | |
|---|---|---|---|
| 1,128,479 | 2/1915 | McPherson . | |
| 1,342,383 | 6/1920 | Horvath | 30/304 |
| 1,424,389 | 8/1922 | Wyatt | 30/304 |
| 1,530,796 | 3/1925 | Thomsen . | |
| 1,805,411 | 3/1929 | Monterio . | |
| 2,396,443 | 8/1944 | Singer | 30/304 |
| 2,557,539 | 9/1948 | Henrickson | 30/287 |
| 2,986,815 | 6/1960 | Fernald et al. | 30/304 |
| 3,545,325 | 12/1970 | Camasta | 83/412 |
| 4,085,504 | 4/1978 | Nagy | 30/123 |
| 4,327,489 | 5/1982 | Conrad | 30/299 |
| 4,818,207 | 4/1989 | Heron | 425/289 |
| 5,343,623 | 9/1994 | Cole et al. | 30/304 |

*Primary Examiner*—Douglas D. Watts
*Attorney, Agent, or Firm*—David L. Ray

[57] ABSTRACT

A food cutting apparatus for cutting food contained in a rectangular pan, the food cutting apparatus having a plurality of food cutting blades connected to a holder for the blades, the improvement including an elongated, generally flat rectangular blade holder for holding a plurality of food cutting blades, the blade holder having two elongated parallel edges connected by two parallel ends being aligned perpendicular to the two parallel edges, the two parallel ends being shorter in length than the two elongated parallel edges, two openings therein for receipt of the fingers of the two hands of the user, a blade holding device in at least one of the two elongated edges for receiving and holding each of the plurality of food cutting blades, and indicia adjacent to at least one of the edges for positioning the cutting blades at a selected location, and two guides connected to the blade holder for slidably contacting each of the two parallel edges of the pan.

A pan holding apparatus is also provided for holding the pan containing the food to be cut while the food is being cut with the apparatus of the invention.

20 Claims, 6 Drawing Sheets

FOOD CUTTER

BACKGROUND OF THE INVENTION

1. Field of the Invention

The invention relates to cutting and slicing devices for cutting food, and, in particular, to devices for cutting pastry. More particularly, the present invention relates to devices having multiple blades for cutting food.

2. Description of the Related Art

Devices for cutting food are known in the art. Some devices of the prior art have single blades and some have multiple blades.

It is important in serving food in schools, health care facilities, and other public and private institutions that flat sheets of food such as pastry be cut into precise and uniform portions to insure that the nutritional content of the portions served is uniform. Uniformity of served portions insures that each person served is provided with a required amount of food to meet prescribed nutritional requirements. The minimum prescribed nutritional value of the food served may be required by the institution serving the food, or may be required by state or federal law.

In some institutions, the food service workers utilized to cut or prepare the minimum portions of food to be served are unskilled, or physically and/or mentally disadvantaged. Such workers may encounter great difficulty in cutting uniform portions of food items such as pastry or other items cooked in large rectangular pans. The use of a knife having a single blade to cut uniform and precise portions of food in such pans is sometimes difficult for a skilled worker, particularly when many pans of food must be cut by a single individual and fatigue is encountered.

Exemplary of the cutting and slicing devices of the prior art are the following U.S. Pat. Nos. 5,343,623; 4,818,207; 4,327,489; 4,085,504; 3,545,325; 2,986,815; 2,557,539; 2,396,443; 1,805,411; 1,530,796; and 1,128,479.

SUMMARY OF THE INVENTION

In accordance with the present invention there is provided a food cutting apparatus for cutting food contained in a rectangular pan, the food cutting apparatus having a plurality of food cutting blades connected to a holder for the blades, the improvement including an elongated, generally flat rectangular blade holder for holding a plurality of food cutting blades, the blade holder having two elongated parallel edges connected by two parallel ends being aligned perpendicular to the two parallel edges, the two parallel ends being shorter in length than the two elongated parallel edges, two openings therein for receipt of the fingers of the two hands of the user, a blade holding device in at least one of the two elongated edges for receiving and holding each of the plurality of food cutting blades, and indicia adjacent to at least one of the edges for positioning the cutting blades at a selected location, and two guides connected to the blade holder for slidably contacting each of the two parallel edges of the pan.

A pan holding apparatus is also provided for holding the pan containing the food to be cut while the food is being cut with the apparatus of the invention.

The invention has the advantage of enabling unskilled employees in the food industry to be able to easily control the size of the portions on food served.

The invention has the further advantage of reducing stress on the wrist of the worker and reduces the number of steps needed to cut portions of food in a pan.

An additional advantage of the invention is that several different types of cutting blades may be employed as desired.

DESCRIPTION OF THE PREFERRED EMBODIMENTS

Referring now to the drawings, in FIGS. 1–3, 16, and 20 is shown the elongated blade holder of the invention generally indicated by the numeral 10. Blade holder 10 can be seen to be generally rectangular in shape, having two parallel edges 12 and 14 and two parallel ends 16 and 18. Blade holder 10 has two outer, parallel rectangular faces 10a—10a, two outer rectangular faces 12a—12a which slope from rectangular faces 10a—10a to edges 12—12, and two outer rectangular faces 14a—14a which slope to edges 14—14. Two scales 12b—12b may be rigidly connected to each of the two outer rectangular faces 12a—12a, and two scales 14b—14b are rigidly connected by gluing or the like to each of the two outer rectangular faces 14a—14a. Each of the scales 12b—12b and 14b—14b may have indicia thereon similar to a common ruler with inches, centimeters, or the like indicated by the indicia thereon. The scales 12b—12b and 14b—14b may be color coded to assist the unskilled or inexperienced user to insure consistent and exact control of the size of the portions of food served. Preferably, rectangular faces 12a—12a and 14a—14a have commonly used scales permanently scribed thereon, and additional scales 12b—12b and 14b—14b are provided as needed.

Two finger holes or openings 20 and 22 shown in FIGS. 1, 3, 10, 13, 16, and 20 are located in blade holder 10 and extend from one rectangular face 10a to the other rectangular face 10a for receipt of the fingers 24 of the user. Holes 20 and 22 are preferably generally rectangular in shape with the longer edges 20c, 20d and 22c, 22d aligned parallel to edges 12 and 14. Holes 20 and 22 are wave-shaped on their inner edges and have four troughs 20a and 22a separated by four peaks 20b and 22b for comfortable receipt of the four fingers 24 of each hand 26 of the user. A circular hole 23 may be provided to extend from one rectangular face 10a to the other rectangular face 10a for enabling blade holder 10 to be hung vertically on a peg or nail when not in use.

Figure 1:
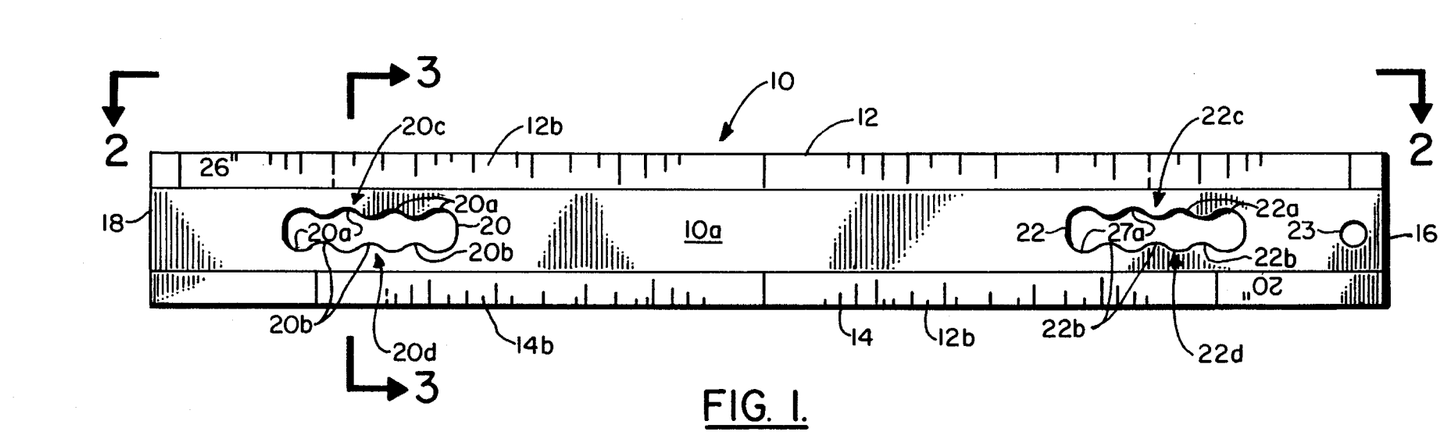
FIG. 1 is a top plan view of the blade holder of the invention.
Figure 2:
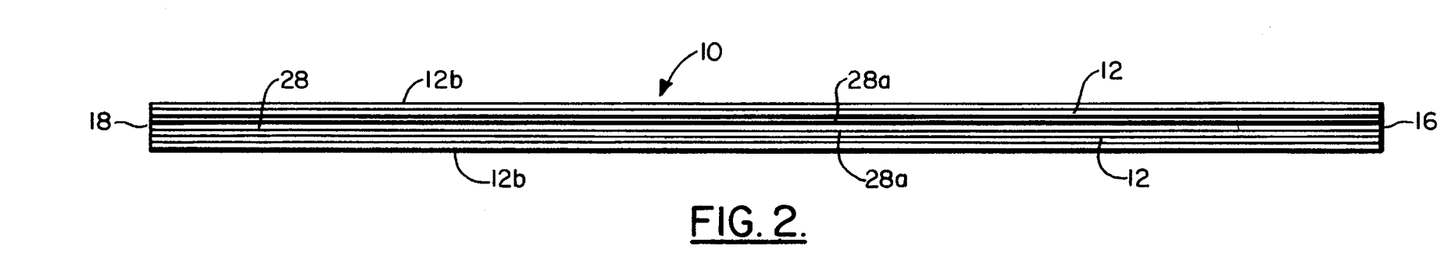
FIG. 2 is a side view of the blade holder of the invention taken along lines 2—2 of FIG. 1.

Preferably a slot generally indicated by the numeral 28 is located in blade holder 10 adjacent to edge 12 and a slot 30 is located in blade holder 10 adjacent to edge 14. If desired, a single slot 28 could be formed in blade holder 10 and slot 30 could be omitted, but two slots 28 and 30 are preferred for greater versatility.

Slots 28 and 30 are preferably generally rectangular and are preferably identical in shape. Slots 28 and 30 extend along the complete length of edges 12 and 14, respectively. Each of slots 28 and 30 have two rectangular protuberances 28a, 28b and 30a, 30b, respectively, which preferably extend along the complete length of slots 28 and 30 and divide slots 28 and 30 into two rectangular portions 28c and 28d, and 30c and 30d.

Figure 13:
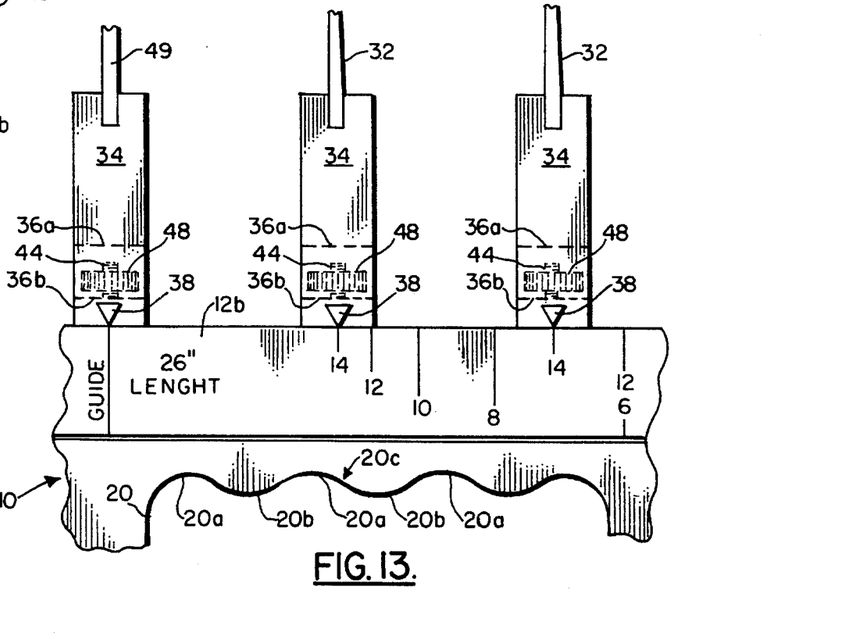
FIG. 13 is a partly cut-away, elevational view of FIG. 10 taken along lines 13—13 of FIG. 10.
Figures 15, 16:
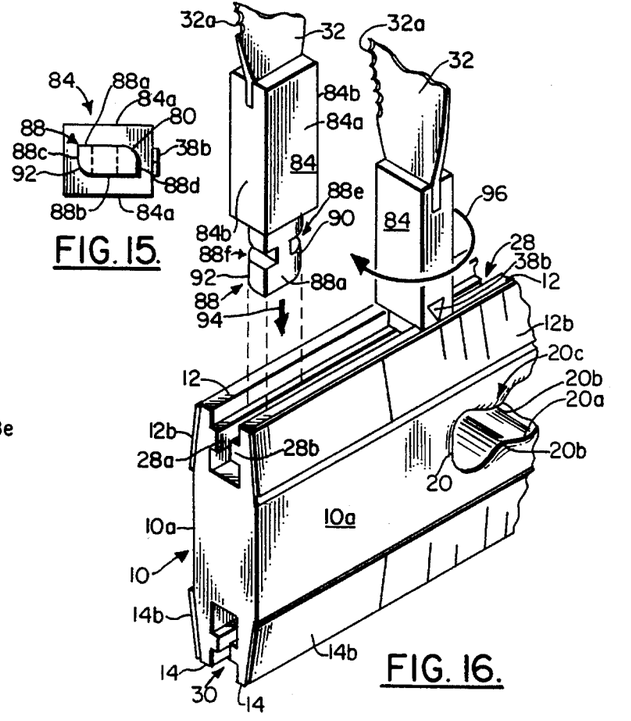
FIG. 15 is a plan view of the cutting blade assembly of FIG. 14 taken along lines 15—15 of FIG. 14.
FIG. 16 is a partly cut-away, perspective view of the blade holder of the invention showing the connection of the cutting blade assembly of FIGS. 14–15 connected thereto.

In each of FIGS. 4, 5, 10, 13, and 20 is shown a preferred knife blade 32 having preferably having serrations 32a thereon to aid in cutting food. Serrations 32a may be deleted if desired. Blade 32 is rigidly connected by force fitting or any other conventional method to knife blade handle 34. Knife blade handle 34 has two parallel rectangular sides 34a—34a and two parallel rectangular sides 34b—34b. One side 34b has a triangular indicator 38 aligned with blade 32 for positioning blades 32 at a selected location relative to scale 12b as shown in FIGS. 13 and 16.

Figures 3, 4, 5, 6, 7, 8, 9:
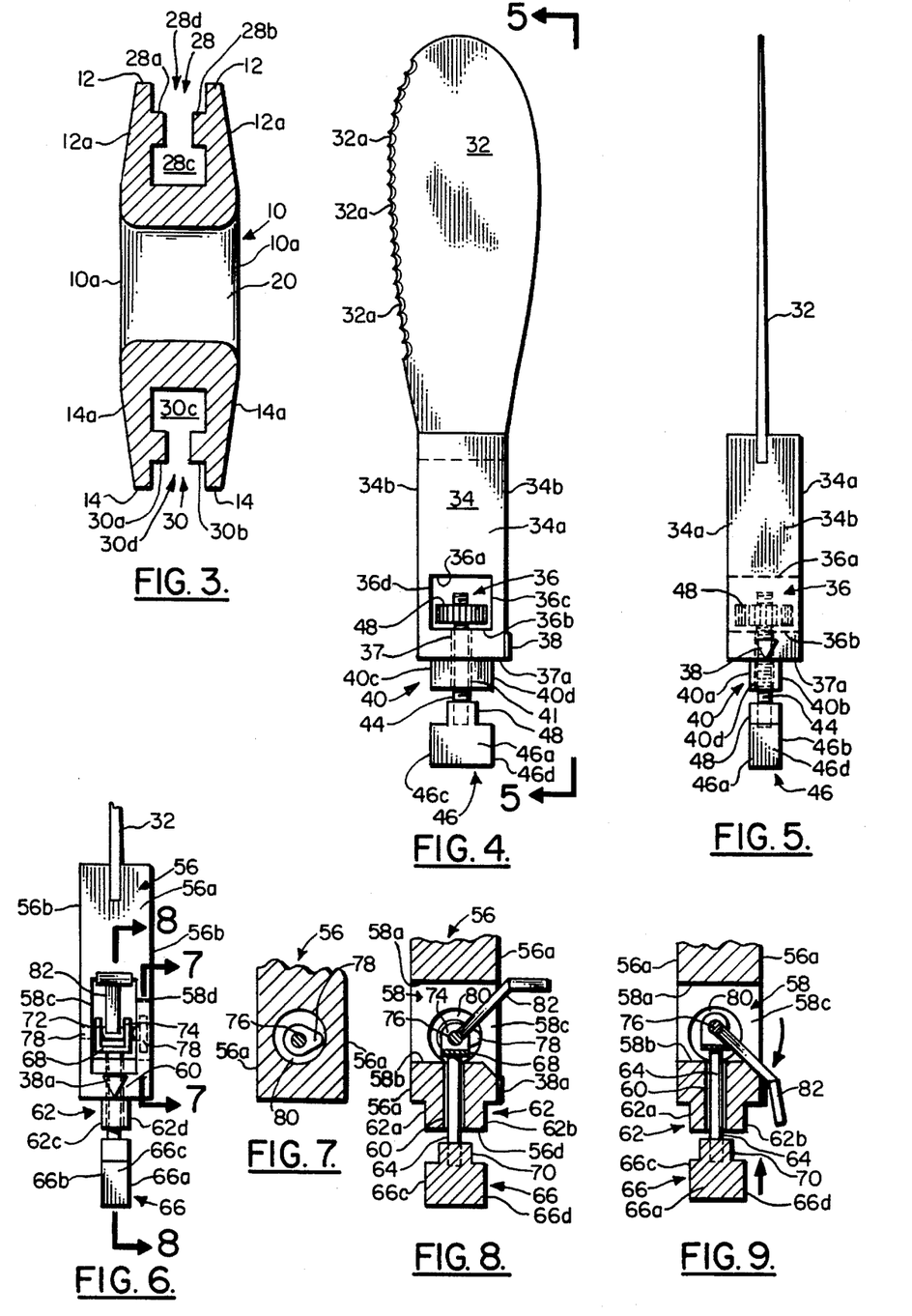
FIG. 3 is a cross sectional view of the blade holder of FIG. 1 taken along lines 3—3 of FIG. 1.
FIG. 4 is an elevational view of a preferred cutting blade assembly of the present invention.
FIG. 5 is an elevational view of the blade assembly of FIG. 4 taken along lines 5—5 of FIG. 4.
FIG. 6 is an elevational view, partly cut-away, of a second embodiment of a cutting blade assembly of the invention.
FIG. 7 is a partly cross-sectional view, partly cut-away, of the cutting blade assembly of FIG. 6 taken along lines 7—7 of FIG. 6.
FIG. 8 is a partly cross-sectional view, partly cut-away, of the cutting blade assembly of FIG. 6 taken along lines 8—8 of FIG. 6.
FIG. 9 is the cutting blade assembly of FIG. 8 showing the locking lever of FIG. 8 moved to the locked position.

A generally rectangular cavity 36 is located in knife blade handle 34 and extends completely therethrough from one side 34a to the other side 34a. Cavity 36 has a generally rectangular top or ceiling 36a and a generally rectangular base or floor 36b parallel thereto, and two generally rectangular parallel sidewalls 36c and 36d.

As shown in FIG. 4, a cylindrical hole or channel 37 extends from base or floor 36b of handle 34 to the bottom 37a of handle 34. A generally rectangular guide member generally indicated by the numeral 40 is integrally formed with handle 34 or rigidly connected thereto and has a cylindrical channel 41 extending completely therethrough axially aligned with cylindrical channel 37. Guide member 40 has two larger rectangular parallel sidewalls 40a and 40b, connected by two smaller parallel sidewalls 40c and 40d.

A threaded bolt 44 extends through channels 37 and 41. A locking member generally indicated by the numeral 46 is rigidly connected to one end of bolt 44 and a threaded nut 48 is attached to the other end of bolt 44. Locking member 46 is generally rectangular in shape and has two larger rectangular parallel sidewalls 46a and 46b connected by two smaller parallel sidewalls 46c and 46d. The distance between sidewalls 46a and 46b must be less than the distance between adjacent, facing protuberances 28a-28b and 30a-30b for locking member 46 to be insertable therebetween. Locking member 46 has a generally rectangular tip 48 integrally formed therewith surrounding and rigidly connected to bolt 44.

Figure 10:
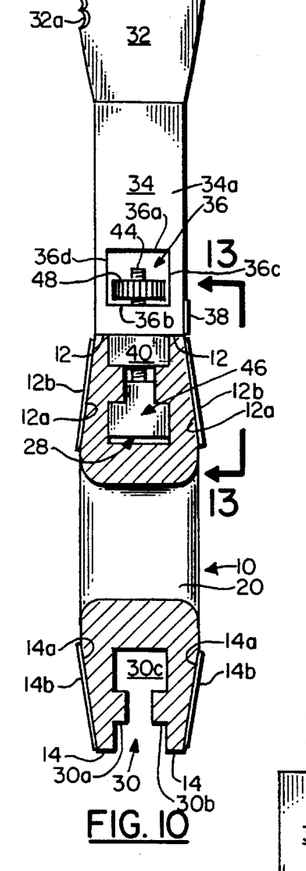
FIG. 10 is a partly cross-sectional, partly cut-away, elevational view of the cutting blade assembly of FIGS. 4 and 5 connected to the blade holder shown in FIGS. 1–3.
Figure 11:
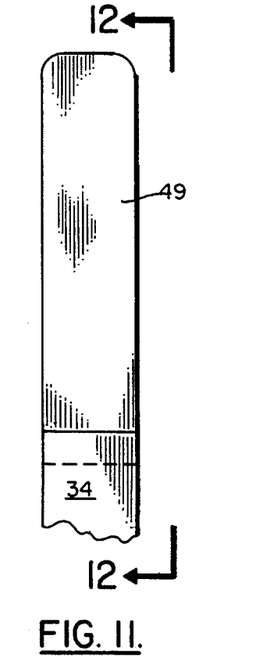
FIG. 11 is a partly cut-away, elevational view of a blade holder guide of the invention.
Figure 12:
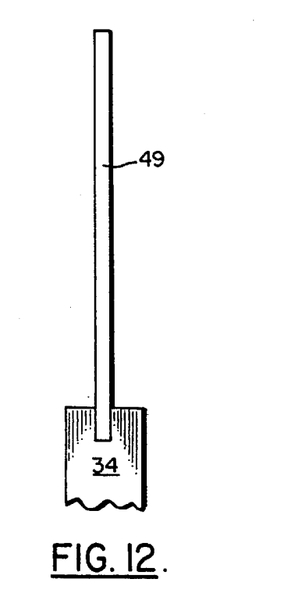
FIG. 12 is a partly cut-away, elevational view of the blade holder guide of FIG. 11 taken along lines 12—12 of FIG. 11.

Blade 32 and handle 34 are shown connected to blade holder 10 in FIG. 10. To connect blade 22 and handle 34 to blade holder 10, locking member 46 is oriented in the position shown in FIGS. 4 and 5 by turning bolt 44 relative to nut 48. Locking member 46 and guide member 40 are then inserted into the slot 28 in the open end 18 of blade holder 10, moved to the position desired on blade holder 10, and nut 48 is rotated with the fingers to lock blade 32 and handle 34 in the desired position.

Figure 20:
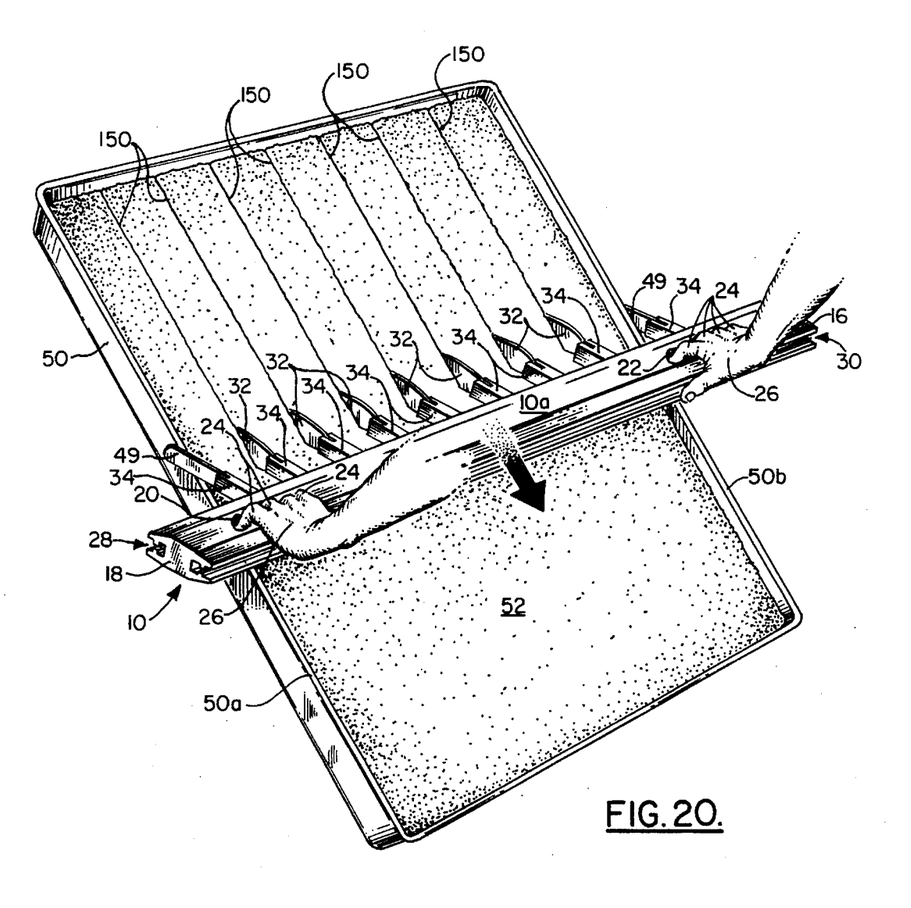
FIG. 20 is a perspective view of the food cutter of the invention cutting a rectangular pan of food.

A generally rectangular guide blade 49 for contacting the outer edge 50a of a pan 50 holding food is shown in FIGS. 11, 12, 13, and 20. Guide blade 49 is attached to handle 34 which has been described above. Guide blade 49 merely replaces blade 32 on the outer ends 16 and 18 of blade holder 10 as shown in FIGS. 13 and 20. Two guide blades 49—49 shown in FIG. 20 make sliding contact with two parallel edges outer edges 50a and 50b of pan 50 and guide blade holder 10 and blades 32 to make straight and uniform cuts in food 52 contained in pan 50.

An alternate handle 56 for blade 32 or guide blade 49 is shown in FIGS. 6–9. Knife blade handle 56 has two parallel rectangular sides 56a—56a and two parallel rectangular sides 56b—56b. One side 56a has a triangular indicator 38a aligned with blade 32 for positioning blades 32 at a selected location relative to scale 12b.

A generally rectangular cavity 58 is located in knife blade handle 56 and extends completely therethrough from one side 56a to the other side 56a. Cavity 58 has a generally rectangular top or ceiling 58a and a generally rectangular base or floor 58b parallel thereto, and two generally rectangular parallel sidewalls 58c and 58d.

As shown in FIGS. 6, 8, and 9, a cylindrical hole or channel 60 extends from base or floor 58a of cavity 58 to the bottom 56d of handle 56. A generally rectangular guide member generally indicated by the numeral 62 is identical to guide member 40 and is integrally formed with handle 56 or rigidly connected thereto. Guide member 62 has cylindrical channel 60 extending completely therethrough. Guide member 62 has two larger rectangular parallel sidewalls 62a and 62b, connected by two smaller parallel sidewalls 62c and 62d.

A cylindrical pin 64 extends through channel 60. A locking member generally indicated by the numeral 66 is rigidly connected to the bottom end of bolt 64 and a flat plate 68 is attached to the top end of bolt 64.

Flat plate 68 has two parallel upwardly extending end supports 72 and 74 integrally formed therewith. A horizontal cylindrical shaft 76 is rotatably received in end supports 72 and 74. Rigidly connected to the two ends of shaft 76 are cam members 78—78. Cam members 78—78 are rotatably received in cylinders 80—80 which extend through each sidewall 58c and 58b of cavity 58. A lever 82 is rigidly connected to shaft 76.

Locking member 66 is identical to locking member 46 and is generally rectangular in shape. Locking member 66 has two larger rectangular parallel sidewalls 66a and 66b connected by two smaller parallel sidewalls 66c and 66d. The distance between sidewalls 66a and 66b must be less than the distance between adjacent, facing protuberances 28a–28b and 30a–30b for locking member 66 to be insertable therebetween. Locking member 66 has a generally rectangular tip 70 integrally formed therewith surrounding and rigidly connected to pin 64.

Blade 32 and handle 56 are connected to blade holder 10 in the same manner as blade 32 and handle 34. To connect blade 32 and handle 56 to blade holder 10, locking member 66 is oriented in the position shown in FIG. 8 by moving lever 82 to the position shown in FIG. 8. Locking member 66 and guide member 62 are then inserted into the slot 28 in the open end 18 of blade holder 10, moved to the position desired on blade holder 10, and lever 82 is moved to the position shown in FIG. 9 to lock blade 32 and handle 56 in the desired position.

Figure 14:
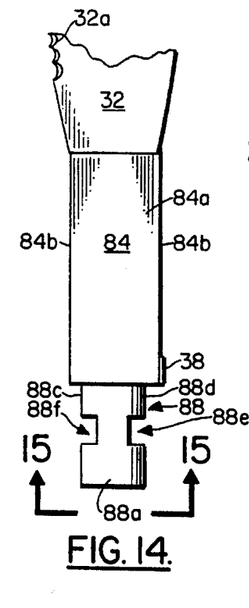
FIG. 14 is an partly cut-away, elevational view of a third embodiment of a cutting blade assembly of the invention.

In each of FIGS. 14–16 is shown preferred knife blade 32 having preferably having serrations 32a thereon to aid in cutting food. Blade 32 is rigidly connected by force fitting or the like to alternate preferred knife blade handle 84. Knife blade handle 84 has two parallel rectangular sides 84a—84a and two parallel rectangular sides 84b—84b. One side 84b has a triangular indicator 38b aligned with blade 32 for positioning blades 32 at a selected location relative to scale 12b. A generally rectangular guide member generally indicated by the numeral 88 is integrally formed with handle 84 or rigidly connected thereto. Guide member 88 has two larger generally rectangular parallel sidewalls 88a and 88b, connected by two smaller parallel sidewalls 88c and 88d. Two rectangular slots 88e and 88f are formed in the approximate center of sidewalls 88a, 88b, 88c and 88d for sliding receipt of protuberances 28a and 28b. The intersection 90 of sidewalls 88a and 88d is arcuate, and the intersection 92 of sidewalls 88b and 88c is arcuate as indicated in FIG. 15.

To connect handle 84 to blade holder 10, handle 84 is inserted into slot 28 as shown in FIG. 16 as indicated by arrow 94 and triangular indicator 38a is aligned as desired relative to scale 12b. Handle 84 is then turned as indicated by arrow 96 to lock handle 84 to holder 10.

Figure 17A:
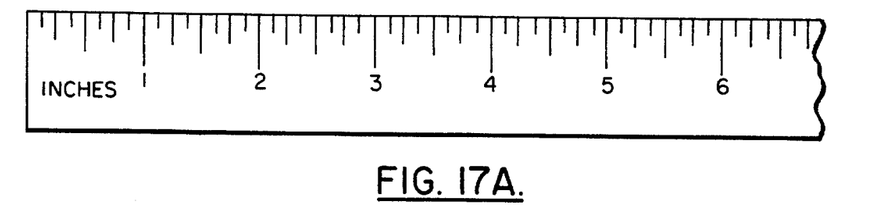
FIG. 17A is a partly cut-away, plan view of a first scale which may be connected to the blade holder of the invention.
Figure 17B:
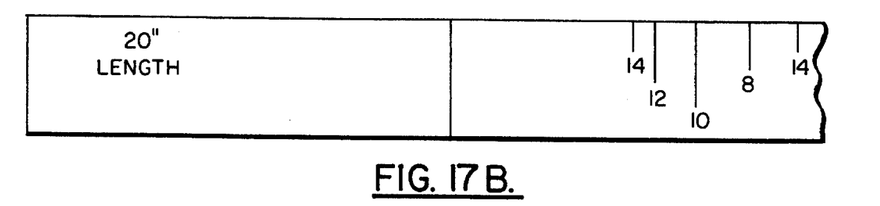
FIG. 17B is a partly cut-away, plan view of a second scale which may be connected to the blade holder of the invention.
Figure 17C:
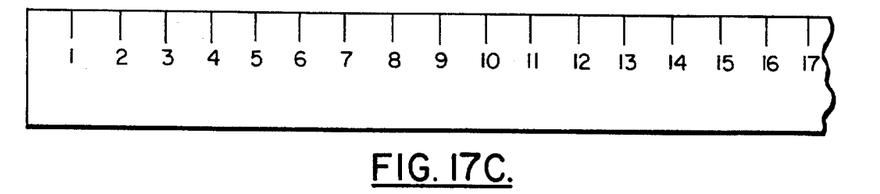
FIG. 17C is a partly cut-away, plan view of a third scale which may be connected to the blade holder of the invention.

Additional scales 96, 98, and 100 are shown in FIGS. 17A, 17B, and 17C which may replace scales 12b and 14b as desired.

Figure 18:
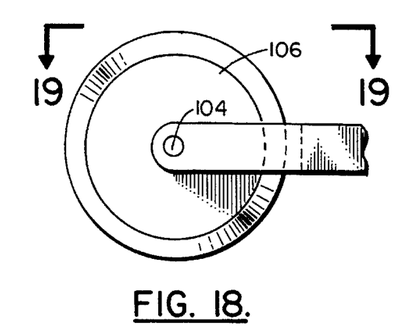
FIG. 18 is a partly cut-away, plan view of a second embodiment of a blade of the invention.
Figure 19:
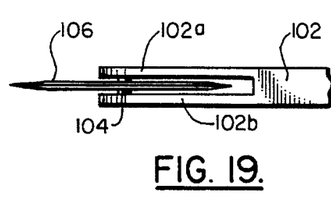
FIG. 19 is a side view, partly cut-away, of the blade of FIG. 18 taken along 19—19 of FIG. 18.

In FIGS. 18 and 19 is shown a roller blade mechanism which could be attached to any of the handles 34, 56, or 84 described above. Roller blade holder 102 can be rigidly connected to handles 34, 56, or 84 by force fitting or the like. Roller blade holder 102 has two fork members 102a and 102b which are rigidly connected to pin 104. Circular blade 106 is rotatably connected to pin 104. Circular blade 106 is similar to a conventional pizza cutting blade.

Figure 21:
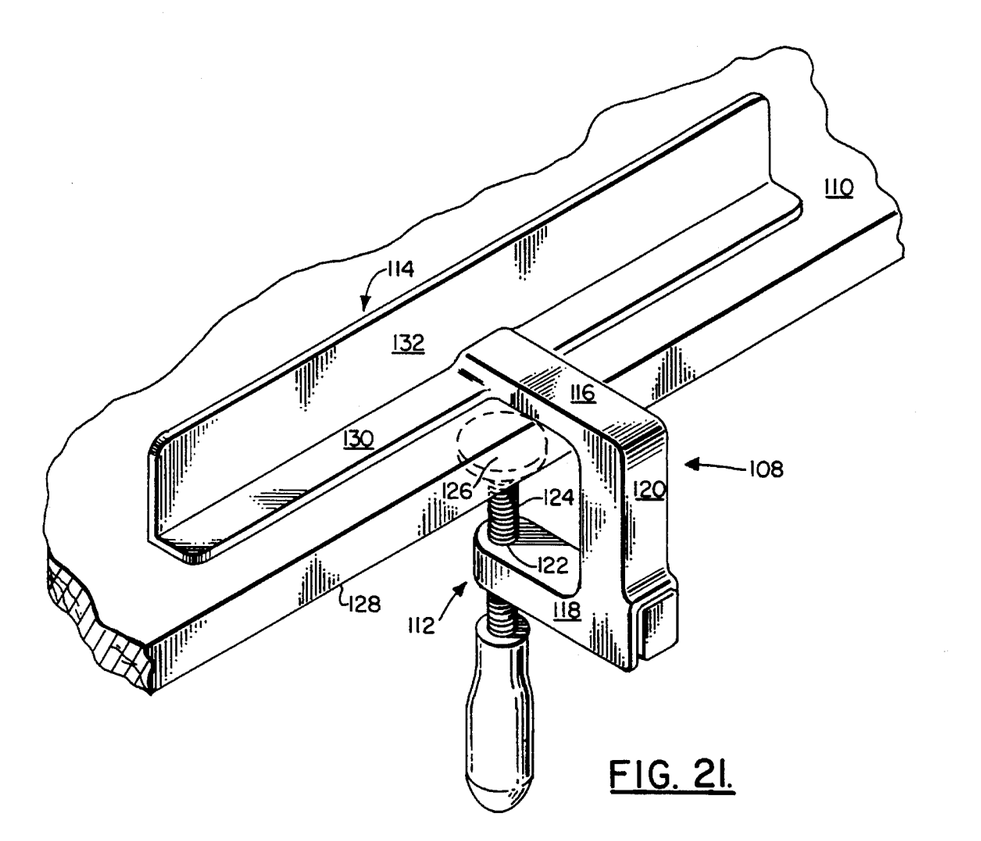
FIG. 21 is a partly cut-away, perspective view of removable stop shown attached to a surface upon which a pan of food may be placed.
Figure 22:
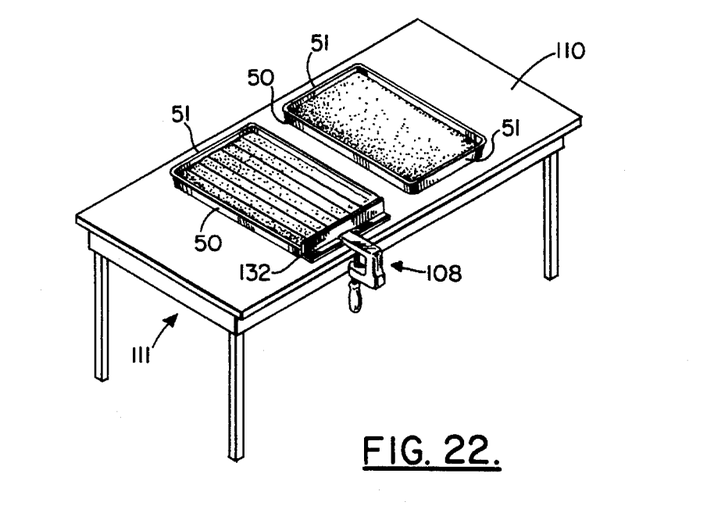
FIG. 22 is perspective view of the removable stop shown in FIG. 21 attached to the surface of a table having two pans of food thereon.

In FIGS. 21 and 22 is shown a pan holding apparatus generally indicated by the numeral 108 connected to table top 110 of the table generally indicated by the numeral 111. Pan holding apparatus 108 includes a C-clamp generally indicated by the numeral 112 having a rigid elongated L-shaped member generally indicated by the numeral 114 connected thereto.

C-clamp 112 includes two parallel bars 116 and 118 rigidly connected perpendicularly to bar 120 or integrally formed therewith. Bar 118 has an internally threaded cylindrical channel 122 in which is received externally threaded bolt 124. Bolt 124 has a handle 126 rigidly connected to the bottom end thereof and a circular disc 126 rotatably connected to the top end thereof for engaging the bottom side 128 of table top 110.

Elongated L-shaped member 114 has a rectangular horizontal base 130 to which rectangular stop 132 is rigidly connected. Rectangular stop 132 is perpendicular to horizontal base 130 and is preferably integrally formed therewith. Rectangular base 130 is rigidly connected to bar 116 by welding or the like.

As can be seen in FIG. 22, pan holding apparatus 108 is clamped to table top 110 and one of the two shorter ends 51 of rectangular pan 50 is placed against rectangular stop 132.

As shown in FIG. 20, the blades 32 and guides 49—49 are attached to blade holder 10, blade holder 10 is grasped by both hands of the user, guides 32 are aligned with opposite sides of pan 50, and holder 10 is drawn along the length of pan 50 by the user to make parallel cuts 150. After the cuts 150 extend the full length of pan 50, pan 50 is rotated 90°, blades 32 are reset at the desired location on holder 10, guides 49—49 are reset to contact the shorter ends 51 of pan 50, and cuts are made perpendicular to cuts 150. The cut portions are then removed from pan 50 by any conventional means and served.

Although the preferred embodiments of the invention have been described in detail above, it should be understood that the invention is in no sense limited thereby, and its scope is to be determined by that of the following claims:

What is claimed is:

1. In a food cutting apparatus for cutting food contained in a rectangular pan, the food cutting apparatus having a plurality of food cutting blades connected to a holder for said blades, the improvement comprising:

a. an elongated, generally flat rectangular blade holder for holding said plurality of food cutting blades, said blade holder having
      i. two elongated parallel edges connected by two parallel ends aligned perpendicular to said two parallel edges, said two parallel ends being shorter in length than said two elongated parallel edges,
      ii. two openings therein for receipt of the fingers of the two hands of the user,
      iii. blade holding means in at least one of said two elongated edges for receiving and holding each of said plurality of food cutting blades, and
      iiii. indicia adjacent to at least one of the edges for positioning said cutting blades at a selected location,
   b. a plurality of food cutting blades connectable to said blade holder, said food cutting blades having attachment means connected thereto for selective receipt in said blade holding means, and
   c. two guide means connected to said blade holder for slidably contacting each of said two parallel edges of said pan.

2. The apparatus of claim 1 wherein said openings extend completely through said blade holder.

3. The apparatus of claim 2 wherein said openings are generally rectangular in shape.

4. The apparatus of claim 1 wherein said blade holding means comprise at least one slot in one of said two elongated edges for receiving and holding each of said plurality of food cutting blades.

5. The apparatus of claim 4 wherein said slot extends along the full length of said edge.

6. The apparatus of claim 5 wherein said slot is generally rectangular in shape.

7. The apparatus of claim 6 wherein said slot has two generally rectangular protuberances therein for engaging said attachment means connected to said food cutting blades for rigidly fastening said food cutting blades to said blade holder.

8. The apparatus of claim 7 wherein said guide means have attachment means connected thereto for engaging said protuberances in said slot means to rigidly fasten said food cutting blades to said blade holder.

9. The apparatus of claim 4 wherein said blade holding means comprises at least one slot in each of said two elongated edges for receiving and holding each of said plurality of food cutting blades.

10. In a food cutting apparatus for cutting food contained in a rectangular pan, the food cutting apparatus having a plurality of food cutting blades connected to a holder for said blades, the improvement comprising:
   a. an elongated, generally flat rectangular blade holder for holding said plurality of food cutting blades, said blade holder having
      i. two elongated parallel edges connected by two parallel ends aligned perpendicular to said two parallel edges, said two parallel ends being shorter in length than said two elongated parallel edges,
      ii. two openings therein for receipt of the fingers of each hand of the user thereof,
      iii. at least one slot in one of said two elongated edges for receiving and holding each of said plurality of food cutting blades, and
      iiii. indicia adjacent to said slot for positioning said cutting blades at a selected location in said slots,
   b. a plurality of food cutting blades connectable to said blade holder, said food cutting blades having attachment means connected thereto for selective receipt in said slot, and
   c. two guide means connected to said blade holder for slidably contacting each of said two parallel edges of said pan.

11. The apparatus of claim 10 wherein said openings extend completely through said blade holder.

12. The apparatus of claim 11 wherein each of said slots extend along the full length of said two parallel edges.

13. The apparatus of claim 12 wherein each of said slots is generally rectangular in shape and each of said slots has two generally rectangular protuberances therein for engaging said attachment means connected to said food cutting blades for rigidly fastening said food cutting blades to said blade holder.

14. In a food cutting apparatus for cutting food contained in a rectangular pan, the food cutting apparatus having a plurality of food cutting blades connected to a holder for said blades, the improvement comprising:
   a. an elongated, generally flat, generally rectangular blade holder for holding said plurality of food cutting blades, said blade holder having
      i. two elongated parallel longer edges connected by two shorter edges,
      ii. two openings therein for receipt of the fingers of the two hands of the user,
      iii. blade holding means in at least one of said two elongated edges for receiving and holding each of said plurality of food cutting blades, and
      iii. indicia adjacent to at least one of the edges for positioning said cutting blades at a selected location,
   b. a plurality of food cutting blades connectable to said blade holder, said food cutting blades having attachment means connected thereto for selective receipt in said blade holding means, and
   c. guide means connected to said blade holder for slidably contacting each of said two parallel edges of said pan.

15. The apparatus of claim 14 wherein said openings extend completely through said blade holder.

16. The apparatus of claim 14 wherein said blade holding means comprise at least one slot in one of said two elongated edges for receiving and holding each of said plurality of food cutting blades.

17. The apparatus of claim 16 wherein said slot has two generally rectangular protuberances therein for engaging said attachment means connected to said food cutting blades for rigidly fastening said food cutting blades to said blade holder.

18. The apparatus of claim 17 wherein said guide means have attachment means connected thereto for engaging said protuberances in said slot means to rigidly fasten said food cutting blades to said blade holder.

19. The apparatus of claim 16 wherein said blade holding means comprises at least one slot in each of said two elongated edges for receiving and holding each of said plurality of food cutting blades.

20. The apparatus of claim 14 wherein said blade holder has at least two guide means connected to said blade holder.

* * * * *